United States Patent [19]

Taccon et al.

[11] 4,076,173
[45] Feb. 28, 1978

[54] ATOMIZER

[76] Inventors: Danizzo Taccon; Gloriano Taccon, both c/o Dr. Ing. Misitano - Novelty, Via Padova, 217, 20127 Milan, Italy

[21] Appl. No.: 670,871

[22] Filed: Mar. 26, 1976

[30] Foreign Application Priority Data

Apr. 3, 1975 Italy .................................. 21954/75

[51] Int. Cl.² ................................................ B05B 7/12
[52] U.S. Cl. ...................................... 239/411; 137/114; 239/412
[58] Field of Search ............... 239/411, 412, 600, 601; 137/114, 604

[56] References Cited

U.S. PATENT DOCUMENTS

| 2,812,771 | 11/1957 | McFarland et al. | 137/114 |
| 3,141,471 | 7/1964 | Williamson | 137/114 |
| 3,561,680 | 2/1971 | Ott | 239/411 |

FOREIGN PATENT DOCUMENTS

| 515,369 | 3/1921 | France | 239/412 |
| 777,321 | 6/1957 | United Kingdom | 239/412 |

Primary Examiner—Evon C. Blunk
Assistant Examiner—Michael Mar

[57] ABSTRACT

An atomizer, particularly suitable for atomizing grease or lubricating compositions and useful in the foundry industry for lubricating molds, comprises a chamber in which is mounted a piston which is displaced from a rest position to an operative position by air under pressure against the effect of a spring operable to urge the piston to the rest position. Air under pressure is admitted to the chamber through an air inlet which is in constant communication with an outlet to the chamber by way of an air passage through the piston. An inlet for the composition to be atomized is controlled by a valve and opens to the chamber at a location at which it is closed when the piston is in the rest position and at which it communicates, in the operative piston position, with the air passage through a further passage provided in the piston so that the composition to be atomized is drawn by a Venturi effect into the air passage and entrained in the air flowing therethrough. The supply of the composition to be atomized is controlled by the valve and can be shut off completely so that only pressurized air is discharged.

3 Claims, 2 Drawing Figures

ATOMIZER

BACKGROUND OF THE INVENTION

Field of the Invention

The present invention relates to improvements in atomizers which are particularly, but not exclusively, suitable for atomizing grease or lubricating compositions as required in the foundry industry for the lubrication of mold. The term "fluid" as used herein is to be understood to include viscous liquids and grease or lubricating compositions.

SUMMARY OF THE INVENTION

An object of the invention is to provide an atomizer of a simple and compact construction capable of atomizing fluids supplied both under pressure or at atmospheric pressure.

A further object of the present invention is to provide an atomizer for use in the foundry industry which may be located at movable or stationary stations for a number of automation purposes.

It is also an object of the invention to provide an atomizer in which the degree of atomizing may be adjusted and in which the supply of fluid to be atomized may be shut off whereby only pressurized air may be discharged as is sometimes required for cleaning or washing purposes.

According to the present invention, there is provided an atomizer which is particularly, but not exclusively, suitable for atomizing lubricating compositions, the atomizer comprising the chamber, a first inlet for admitting air under pressure to said chamber, a piston mounted in said chamber for displacement by said air under pressure from a rest position to a operative position, spring means operable to urge said piston to the rest position, an outlet to said chamber, an air passage through said piston maintaining said outlet in constant communication with said air inlet, a second inlet for admitting fluid to be atomized to said chamber at a location at which it is closed by said piston in the rest position, valve means for controlling the flow of fluid to be atomized to said second inlet and a fluid passage in said piston operable in the operative position of said piston to place said second inlet in communication with said air passage to entain fluid to be atomized in air flowing through said air passage when said control valve is open.

An embodiment of the invention will now be described by way of example only with reference to the accompanying drawings in which:

DETAILED DESCRIPTION OF THE PREFERRED EMBODIMENT

Figure 1:
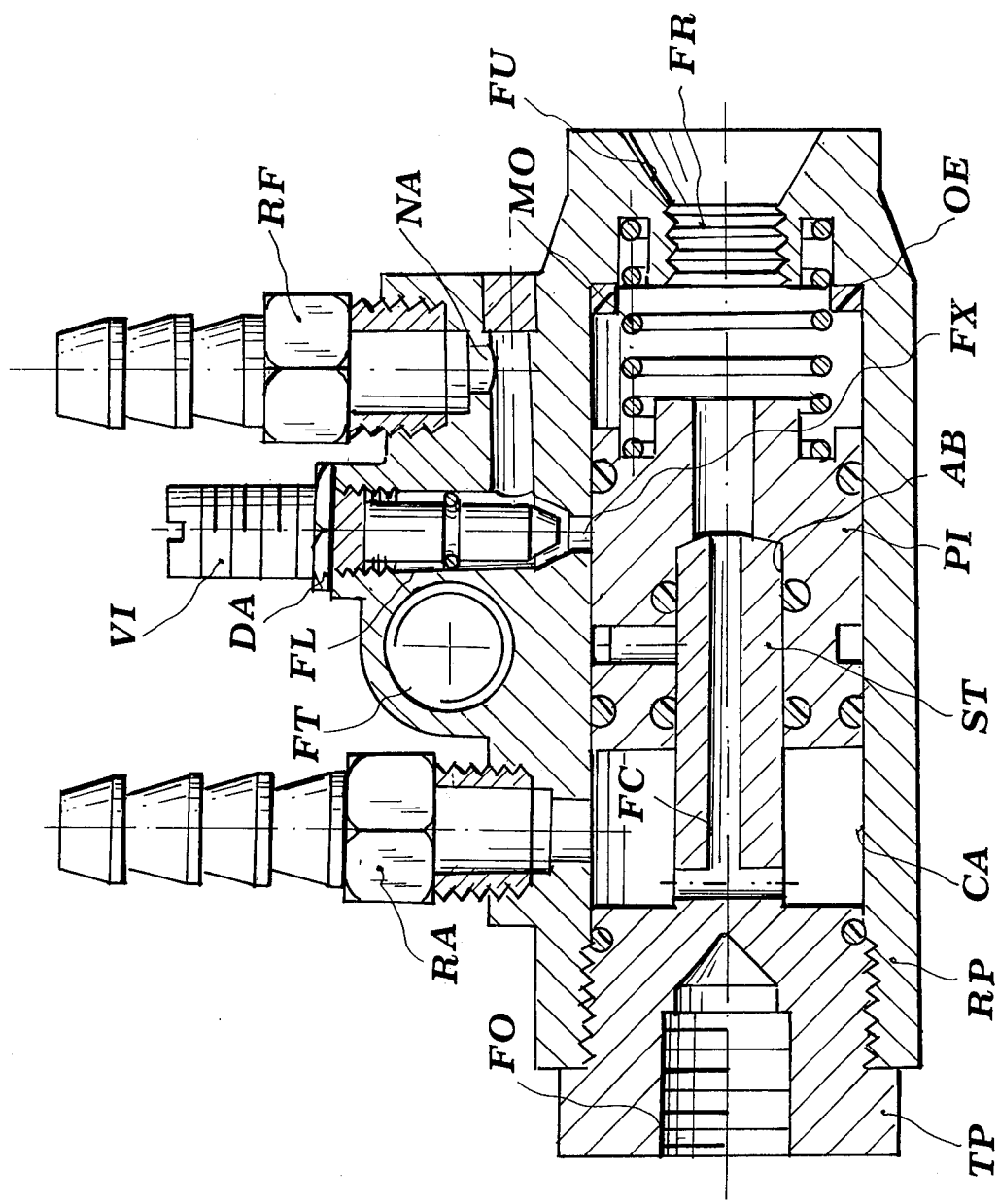
FIG. 1 is a vertical elevational sectional view of an atomizer according to this invention in the rest position.
Figure 2:
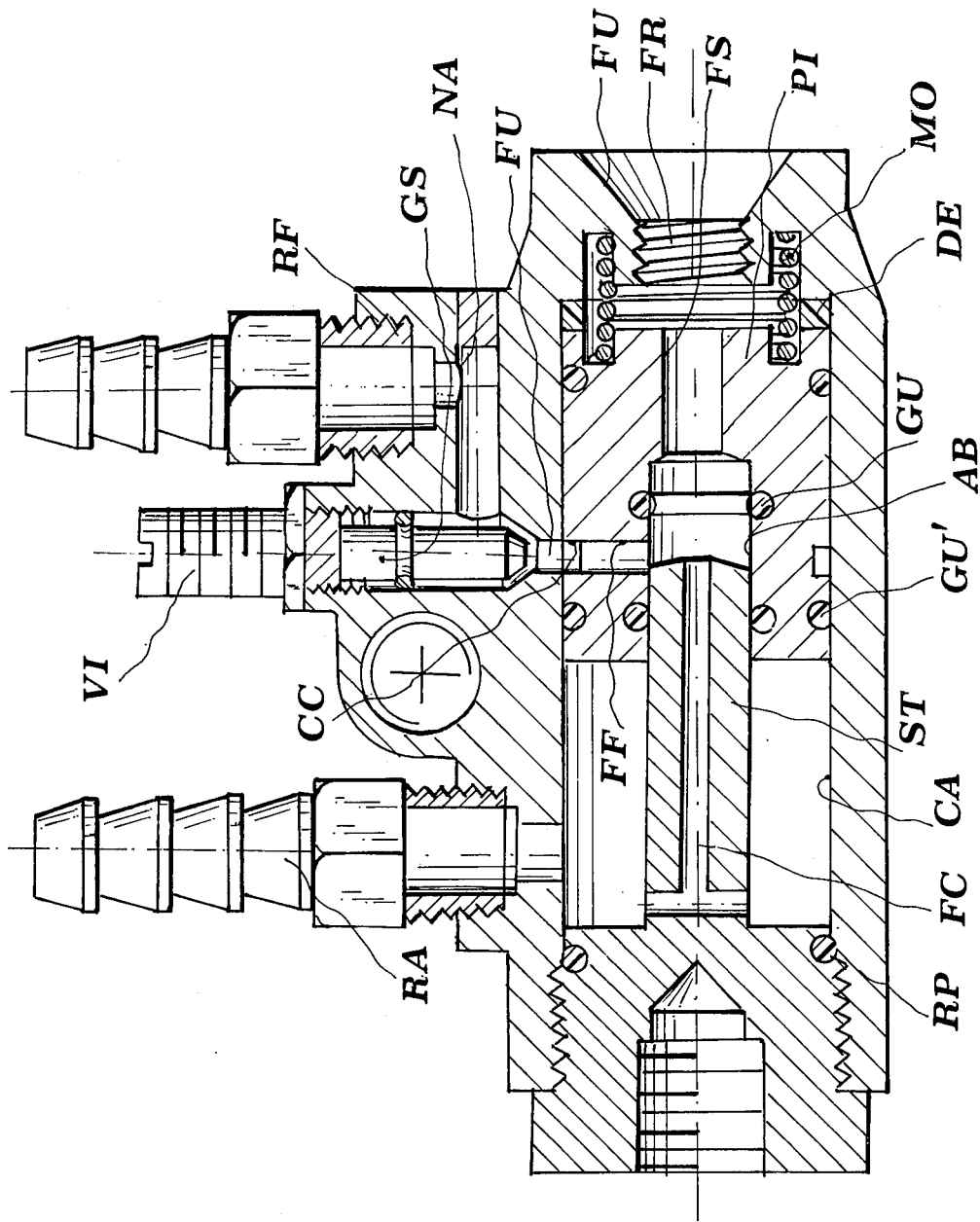
FIG. 2 is a representation as FIG. 1 showing a work position.

The description for grounds of clarity and consistency will follow under the following three headings:
  I  Description of the general structure of the atomizer (FIGS. 1 and 2)
  II  Rest position (FIG. 1)
  III  Work position.

I. DESCRIPTION OF THE GENERAL STRUCTURE (FIGS. 1 & 2)

The atomizer of this example comprises a hollow metal alloy body RP having a threaded union TP screwed into one end thereof. This union has a threaded hole FO to receive a fastening screw (not shown) for attaching the whole to a stationary or movable station. For the same purpose, a threaded passage FT is molded in the body RP to receive a further fastening screw (not shown). The threaded union TP is formed with a cylindrical stem ST which extends into the body RP and which has an axial passage FC which extends from the inner end of the stem ST to a diametral bore through which it is in constant communication with a chamber CA within the body RP. An inlet union RA for pressurised air opens to the chamber CA. An inlet union RF for the fluid to be atomized opens through a control valve VI and passage FX to the chamber CA under the control of a piston PI slidably mounted on the stem ST. A seal is provided between the piston PI and the stem ST by O-ring packaging GU. A further seal is provided between the piston PI and the wall of the cylindrical chamber CA by O-ring packings $GU^1$. The piston is milled with an annular groove CC, from which a radial passage FF extends to the axial passage AB within the piston PI into which the stem ST extends. A spiral spring MO is mounted between the piston PI and the end of the cylindrical chamber CA remote from the threaded union TP. The piston has an axial passage FS that extends between an outlet opening FU and the passage AB in which the stem ST is received so as to communicate through the passage FC with the chamber CA and the air inlet union RA. The outlet opening FU has a conical profile extending inwardly with a threaded portion FR to receive an atomizing nozzle (not shown).

The control valve VI is an adjustable spindle valve with a cylindrical smooth portion GS provided with O-ring packings for air-tight movement in a passage FL of the body, the spindle screw of the valve VI being secured in the desired axial position by a lock nut DA. The spindle of the valve has a frusto-conical portion which cooperates with a frusto-conical seating to control the flow of fluid to be atomised.

The arrangement is such that the spindle valve may be completely closed to stop the supply of fluid to be atomized from the fluid inlet union RF.

II. REST POSITION (FIG. 1)

The return spring MO urges the piston PI against the end of the stem ST to close the passage FX and cut off the supply of fluid to be atomized. The passage FF is closed by the stem ST. The O-ring packings $GU^1$ prevent leakage of such fluid even when pressurized and even if the control valve VI is in the open position. The spring MO is in a substantially relaxed state. Even if some fluid reaches the annular groove CC the O-ring packings GU cooperate with the stem ST to prevent leakage.

III. WORK POSITION (FIG. 2)

The pressure of the pressurized air (coming from RA) upon the piston PI displaces the latter towards the outlet FU against the spring MO, such displacement being limited by an annular shock absorbing body OE (of plastic material). In this position, the passage FX opens to the annular groove CC and the passage FF opens to the passage AB so that pressurized air from the inlet union RA passes through the chamber CA, passage FC, passage AB and passage FS to the outlet opening FU. The speedy passage of the pressurized air exerts a Venturi effect which causes a suction of the fluid to be atomized, whereby the fluid is sucked through the union RF, through the valve VI and passage FF into the air stream and is atomized in a per se known manner. The degree of suction may be adjusted by screwing or unscrewing the adjustment spindle of the control valve VI, so that the atomizer can be used to atomize even fluids which are not pressurized and which might be quite viscous. As soon as the pressurized air supply passage is stopped, the piston PI automatically returns in the position of the FIG. 1 under the reaction of the spring MO.

It will be understood that the passage FX can be isolated from the fluid supply RF by closing the control valve VI so that only pressurized air from the inlet RA is discharged, and this may be required for washing or cleaning molds.

It will be observed that the O-ring packings $GU^1$ provide first and second annular sealing means carried externally on said piston at axially spaced locations on either side of the annular groove CC. The first sealing means $GU^1$ is located between the inlet union RA and the passage FX in both the rest and operative positions of the piston PI and the second sealing means $GU^1$ is located between the passage FX and the outlet FU in both the rest and operative positions of the piston PI.

What we claim is:

1. An atomizer comprising a chamber, a first inlet for admitting air under pressure to said chamber, a piston mounted in said chamber for displacement by said air under pressure from a rest position to an operative position, spring means operable to urge said piston to the rest position, an outlet to said chamber, an air passage through said piston maintaining said outlet in constant communication with said air inlet, a second inlet for admitting fluid to be atomized to said chamber at a location at which it is closed by said piston in the rest position, valve means for controlling the flow of fluid to be atomized to said second inlet and a fluid passage in said piston operable in the operative position of said piston to place said second inlet in communication with said air passage to entrain fluid to be atomized in air flowing through said air passage when said control valve is open, a fixed stem extending within said chamber and into said piston whereby the piston is displaced on said stem between said rest position and said operative position, and a passageway through said stem maintaining said air passage through said piston in communication with said first inlet, said stem engaging said piston in the rest position to limit displacement of said piston under the influence of said spring means, the said fluid passage including a radial passage formed in said piston and opening to the exterior of said piston at a first location in communication with said second inlet in the operative position of said piston and closed by the wall of said chamber in the rest position of said piston, said radial passage opening to the air passage through said piston at a second location at which it is closed by said stem in the rest position of said piston.

2. An atomizer according to claim 1 including an external annular groove formed in said piston into which said radial passage opens at said first location.

3. An atomizer according to claim 1 including first and second annular sealing means carried externally in said piston at axially spaced locations on either side of said first location, the first annular sealing means being between the first and second inlets in both the rest and operative positions of the piston and the second annular sealing means being between said outlet and said second inlet in both the operative and rest positions of the piston.

* * * * *